United States Patent [19]

Steagall et al.

[11] Patent Number: 5,127,001
[45] Date of Patent: Jun. 30, 1992

[54] CONFERENCE CALL ARRANGEMENT FOR DISTRIBUTED NETWORK

[75] Inventors: Robert W. Steagall, North Salt Lake; Steven T. Barham, Salt Lake City; Michael J. Hurst, West Jordan, all of Utah

[73] Assignee: Unisys Corporation, Blue Bell, Pa.

[21] Appl. No.: 544,114

[22] Filed: Jun. 22, 1990

[51] Int. Cl.$^5$ .......................... H04Q 11/04; H04J 3/24
[52] U.S. Cl. ...................................... 370/62; 370/94.1; 379/202
[58] Field of Search ................. 370/62, 60, 60.1, 94.1, 370/94.2, 100.1, 105; 379/202, 158

[56] References Cited

U.S. PATENT DOCUMENTS

| | | | |
|---|---|---|---|
| 4,360,910 | 11/1982 | Segal et al. | 370/62 |
| 4,382,295 | 5/1983 | Moffitt et al. | 370/62 |
| 4,389,720 | 6/1983 | Baxter et al. | 370/62 |
| 4,479,212 | 10/1984 | Albanese | 379/202 |
| 4,658,398 | 4/1987 | Hsing | 370/62 |
| 4,661,949 | 4/1987 | Sato | 370/62 |

Primary Examiner—Douglas W. Olms
Assistant Examiner—H. Kizou
Attorney, Agent, or Firm—Whitham & Marhoefer

[57] ABSTRACT

An arrangement for conducting a conference call over a distributed digital network in which, at each station connected to the conference call, only voice packets from the other stations connected to the conference call are received. To avoid the need for synchronization between stations connected to the conference call, a local time base is established to define a sequence of periodic intervals during which a single voice packet will be accepted from each station connected to the conference call. The interval is advantageously set to be approximately equal the sampling period for data in a received data packet which will be reasonably uniform for all stations on the network. This provides that, typically, a maximum of one data packet will be received from any selected station during a single time base interval. The time base interval can be adaptively adjusted by monitoring the transmission queues of the local or other stations connected to the conference call and the interval can be reduced if a transmission queue exceeds a predetermined length.

20 Claims, 5 Drawing Sheets

CONFERENCE CALL ARRANGEMENT FOR DISTRIBUTED NETWORK

CROSS-REFERENCE TO RELATED APPLICATIONS

This application is related to U.S. patent application Ser. No. 07/542,066, VOICE SERVER FOR DIGITAL COMMUNICATION NETWORK, by Robert W. Steagall, Steven T. Barham and John W. Love, filed concurrently herewith, on Jun. 22, 1990.

BACKGROUND OF THE INVENTION

1. Field of the Invention

This invention relates to voice communications over distributed digital networks (e.g. networks which do not have a central station) such as local area networks and, more particularly, to conference call communications on such distributed digital networks.

2. Description of the Prior Art

Telephonic communications have been well known and in widespread use for many years. The interconnection arrangements which allow selective connection of telephone sets is complex and has developed from manually operated switchboards to elaborate central switching systems now in commercial use. The use of telephonic communication is central to the efficient operation of many offices, laboratories, businesses and the like. Further developments in other fields have also been adapted for use with telephonic communications systems, permitting communication of data other than voice over the telephone system, such as facsimile messages and data originating in digital form in data processing equipment. More recently, telephonic communication systems have begun adopting digital transmission techniques allowing improved noise immunity and greater data density on the existing communication links. The use of optical fibers for the communication link is also an excellent medium for transmission of numerous digital signals representing acoustic or voice signals. However, use of commercial digital voice transmission systems has generally been limited to long distance communications and analog to digital conversion is done at a central office which interfaces with the long distance links. Therefore the analog connection from the subscriber telephone set to the central station remains subject to noise and interference problems.

Similarly, development of data processing equipment has resulted in the use of local, wide and global area networks for transmission of digital data between data processing systems and which will be collectively referred to herein as distributed digital networks, allowing more rapid transmission than is possible over analog telecommunication links using modulator/demodulator devices (Modems) to convert digital signals into audio frequency tones for transmission. These distributed digital networks are also distinguished from telecommunication networks by the fact that they do not have a central station. Thus control of the network, as would otherwise be exerted by a central station, is "distributed".

A distributed digital network has several inherent advantages over a telecommunication network having a central station. Most importantly, a distributed digital network will have no single point of failure and communications may continue between functional stations even when one or more of the stations is non-functional. Further, the distributed digital network can be arranged to enhance security and reliability of communications between stations on the network, such as by encryption or the increase of resistance to interference. A distributed digital network need not be limited to subscriber stations on the network since inter-network or gateway interfaces can be provided to allow connection of the distributed digital network to another network, such as a commercial network.

When a conference call connection has been made in the past, whether using a network with a central station, as in a commercial telephone network, or a distributed network, it has been the practice to use a summing node to sum all the voice signals from all conference member nodes and to then retransmit the summed voice signals to each of the conference member nodes. Such a practice may have been advantageous in analog networks since transmission quality, signal level and other parameters of the analog signal subject to variation could be centrally corrected, insofar as possible, prior to summing of the signals to result in a conference call of improved overall quality. This practice has also been followed, however, in digital networks where the advantage is not as great due to the reduced need for correction of variation in incoming voice signals.

The presence of a summing node also subjects the network to several problems. Specifically, the summing node itself becomes a point at which a single failure can disrupt communication throughout the conference connection or throughout the network. Also, since the voice signal from any conference member node is returned to that conference member node as a portion of the summed signal and at a delay from the initial transmission which may or may not be small, the difficulty of echo suppression at the subscriber (e.g. conference member) node is increased.

Further, particularly as applied to a distributed digital network, the summation of all voice signals is complex and requires equipment at each subscriber station of a cost which makes implementation of conference calls on distributed networks prohibitive. This is true because the technique of digital summation of voice packets requires the equipment to be designed to accommodate the maximum number of possible conference call members at each station, while the network may be used at that capacity only infrequently. Moreover, summation of the voice packets, if plural speakers are, in fact, permitted, has required either synchronization between conference member nodes, which increases the amount of data which must be transmitted over the network, or by providing for summation of the voice packets as they arrive at the conference member nodes, which requires a high degree of circuit complexity to compensate for or otherwise accommodate the separate transmission delays corresponding to each respective conference member. This is so because of the random nature of voice spurts and silences which prevents prediction of when or if a voice packet will arrive from a particular conference member node, particularly when silence detection or voice-activated switching is employed to reduce noise and/or network traffic. Furthermore, when the distributed digital network is used at high traffic density, delays in the network transmission of voice packets become greater and even less predictable.

SUMMARY OF THE INVENTION

It is therefore an object of the present invention to provide an arrangement for providing conference calls without utilizing a summing node.

It is another object of the present invention to provide an arrangement for providing conference calls on a distributed network in which summing of voice signals is simplified and equipment complexity for providing voice signal summing is reduced.

It is an additional object of the present invention to provide an arrangement for providing conference calls on a distributed network in which summing of voice signals is accomplished without increasing complexity or difficulty of echo suppression.

It is a further object of the present invention to provide an arrangement for providing conference calls on a distributed network in which alignment of digital voice signal packets, received in unsynchronized form, is simplified.

In order to achieve the above objects, according to one aspect of the invention, a method is provided which includes the steps of establishing a time base for providing a plurality of periodic signals during a time interval of the conference call, asynchronously receiving said digital voice packets from at least two sources during that time interval, and calculating a sum of all of the digital voice packets received during a time period between sequential ones of the plurality of periodic signals provided by the time base.

According to another aspect of the invention, a voice server is provided for interfacing with a distributed digital network wherein the voice server includes a time base for providing a plurality of periodic signals during a time interval of a conference call, a selective receiver for asynchronously receiving said digital voice packets from at least two sources during said time interval, and an adder for calculating a sum of all digital voice packets asynchronously received during a time period between sequential periodic signals from the time base.

According to another aspect of both the method and apparatus of the invention, the period of the time base is adjusted to coincide with the period of data contained in a single voice packet, preferably in an adaptive manner by monitoring queues of either the same or another station.

In accordance with a yet further aspect of the invention, a distributed digital network for communicating data in packets among a plurality of nodes is provided which includes a time base for providing a plurality of periodic signals during a time interval for at least one node of the network, a receiver for asynchronously receiving digital data packets from at least two sources during a time interval, and a logic circuit for performing a logical operation on the digital data received during a time period between sequential ones of the periodic signals.

In summary, the invention achieves the advantage over the prior art of simplifying the summing of voice packet signals by establishing a time base corresponding to the approximate time interval of data in a voice packet to simplify summing of, at most, only a single voice packet from each of the other stations connected to the conference and sums these packets, preferably linearly, for each time base interval to avoid the need for synchronous operation or realignment of the voice packets, if any, from each station connected to the conference call and to reduce the complexity of echo suppression at each local station. The invention exploits the discovery that small amounts of distortion and/or delay are respectively inaudible or undetectable by a user to achieve simplification of the system while increasing the reliability and integrity of the system. Thus, the invention provides a practical and economic arrangement for conference calls to be conducted over a distributed digital network.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
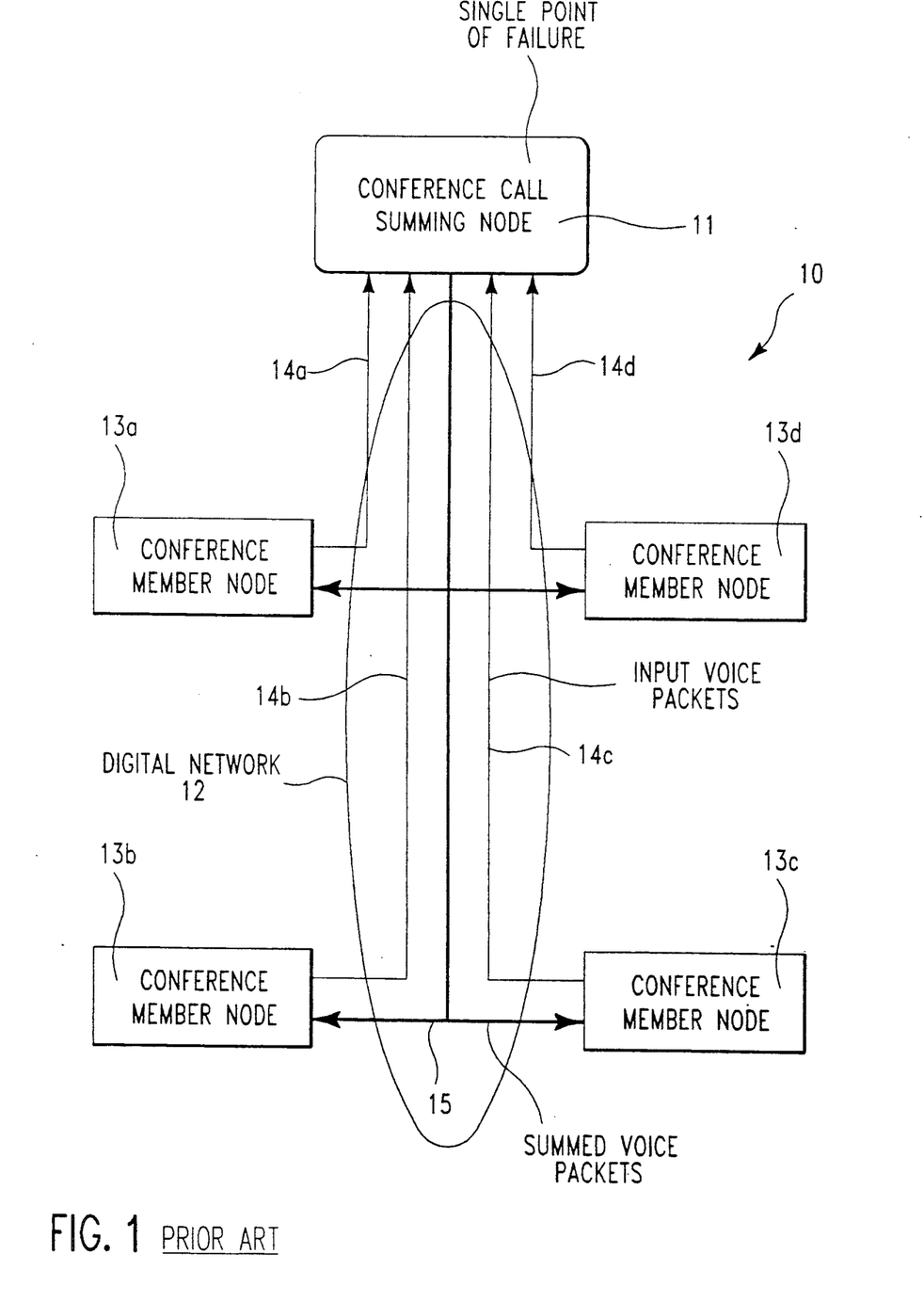
FIG. 1 is a schematic representation of a conference calling arrangement according to the prior art.

Referring now to the drawings, and more particularly to FIG. 1, there is shown a schematic representation of the network 10 connection of a plurality of stations connected in a conference call according to the prior art in which a single summing node is used. In this arrangement, it will be noted that all communication paths 14a-14d, 15 are between the conference member nodes 13a-13d and the single conference call summing node 11. As pointed out above, this architecture is typical of both analog and digital networks having a central switching facility. However, since this invention is directed principally to digital networks in which voice data is transmitted as voice packets, the network has been indicated as a digital network 12 in FIG. 1 to more clearly delineate the invention. Since only a single conference call summing node is used, typically at a central station, it is economically feasible to provide a complex circuit for the purpose. Provision of synchronization or summing of voice packets as they arrive would be a typical feature of such a circuit. However, this arrangement has two principal drawbacks. First, the summing node 11 represents a single point of failure which can disrupt the conference call or the entire network. Second, since voice packets of all conference member nodes are summed and transmitted to all conference member nodes, the signal reproduced at any conference member node would contain voice signals originating at that conference member node as an echo unless such signals are suppressed. While echo suppression is well-known and understood in the art, the problem is not trivial and represents a substantial economic cost, particularly where such data is received at a conference member node mixed with other desired data.

While the single point of failure represented by a central station can be generally avoided by the use of a distributed network, as disclosed in the above noted, concurrently filed, application, the use of digital transmission and the attendant complexities of synchronization and summing has previously been considered to prevent the economical realization of conference calling over a distributed network.

Figure 2:
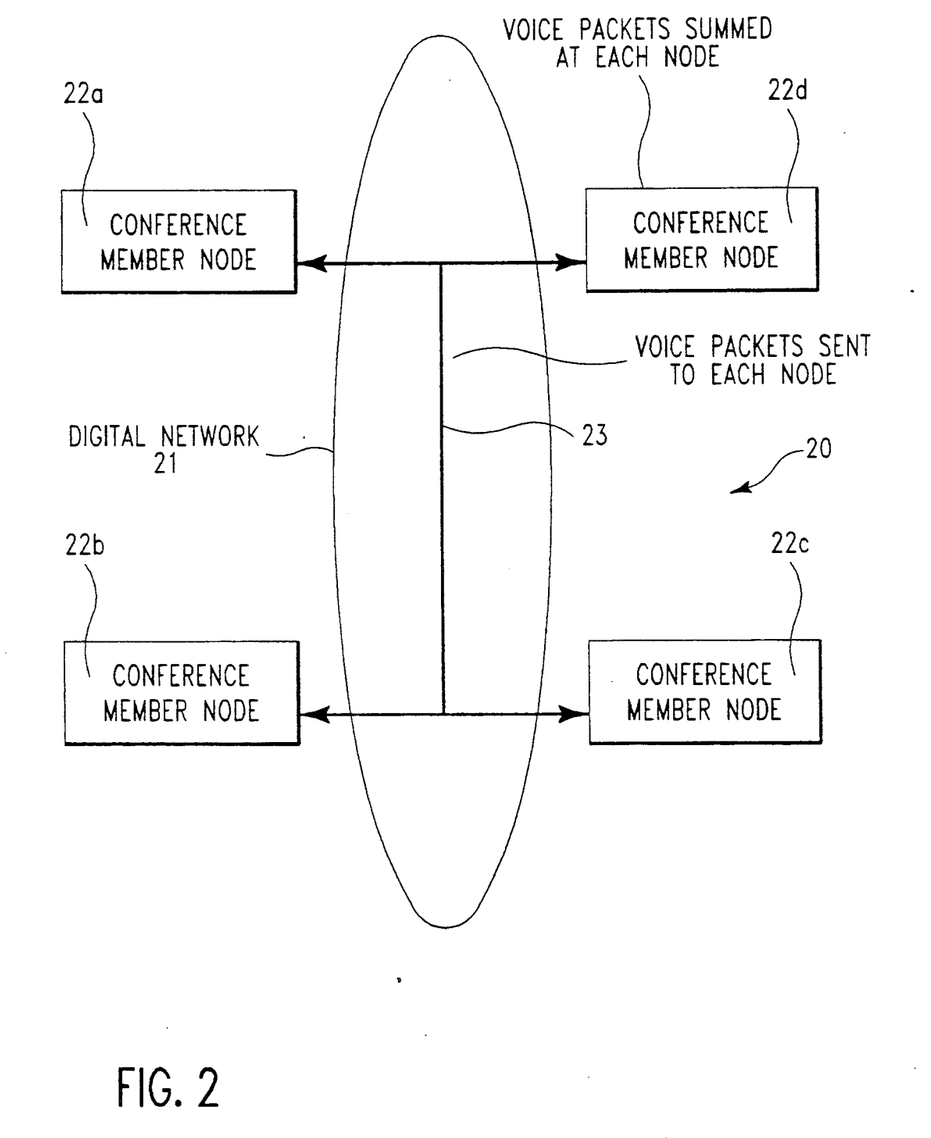
FIG. 2 is a schematic representation of a conference calling arrangement according to the invention.

The conference connection 20 in accordance with a preferred embodiment of the present invention is schematically illustrated in FIG. 2. It is to be understood that the present invention is preferably implemented in a distributed digital network 21 without a central switching facility in the manner discussed in detail in the above-noted, concurrently filed, application. The disclosure of that application is hereby fully incorporated herein by reference for a detailed discussion of suitable distributed digital networks and variations thereon as an environment for the present invention. The application also contains a detailed discussion of how calls and conference calls in particular are initiated, maintained and terminated.

Figure 4:
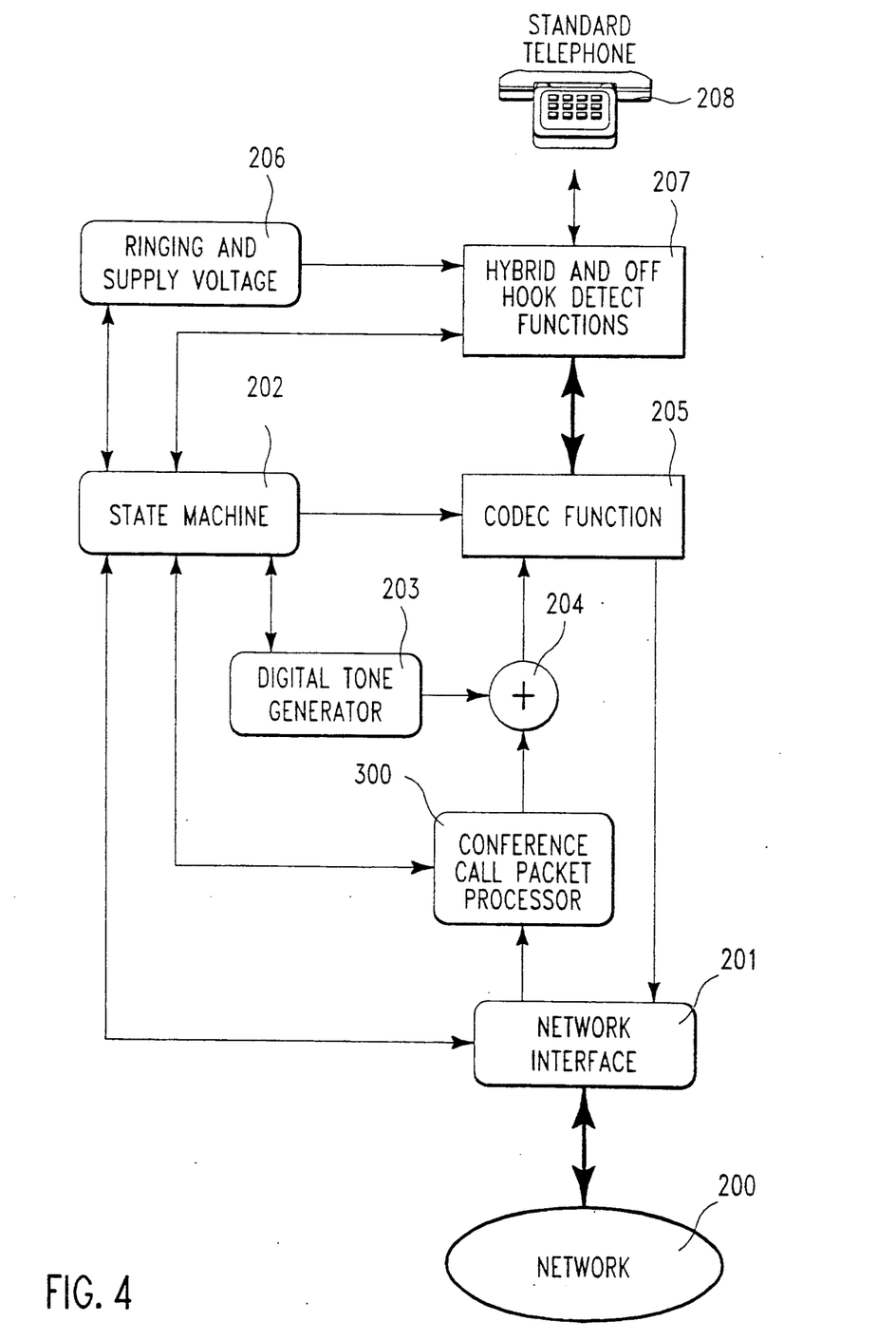
FIG. 4 is a block diagram of a voice server according to the invention.

In contrast to FIG. 1, where separate communication channels 14a-14d are depicted for transmissions from each subscriber to the central station and a single common transmission channel 15 is depicted from the central station to the subscriber stations, a common network channel 23 is shown for network 21 interlinking all conference call member nodes. Each conference member node 22a-22d will include an interface for connecting a local telephone set to the distributed digital network. Such an interface, in combination with such a telephone set will be hereinafter referred to as a voice server. A preferred form of a voice server is illustrated in FIG. 4. However, it is to be understood that the practice of this invention is not limited only to the improved voice server or to distributed digital networks including one or more voice servers of that type.

The voice server of a conference member node has the ability to selectively receive voice packets originating at selected stations in a manner disclosed in the application incorporated by reference above. It is typical for voice packets to include coded identifier data indicating the address of the sending and/or receiving stations for this purpose. During a conference call, voice packets from all stations connected to the conference call would be selectively received while those from all other stations would be rejected. In accordance with the present invention, however, voice packets originating at a given station would also be rejected by that station. This feature greatly simplifies the echo suppression requirements of the equipment at that station.

Figure 3:
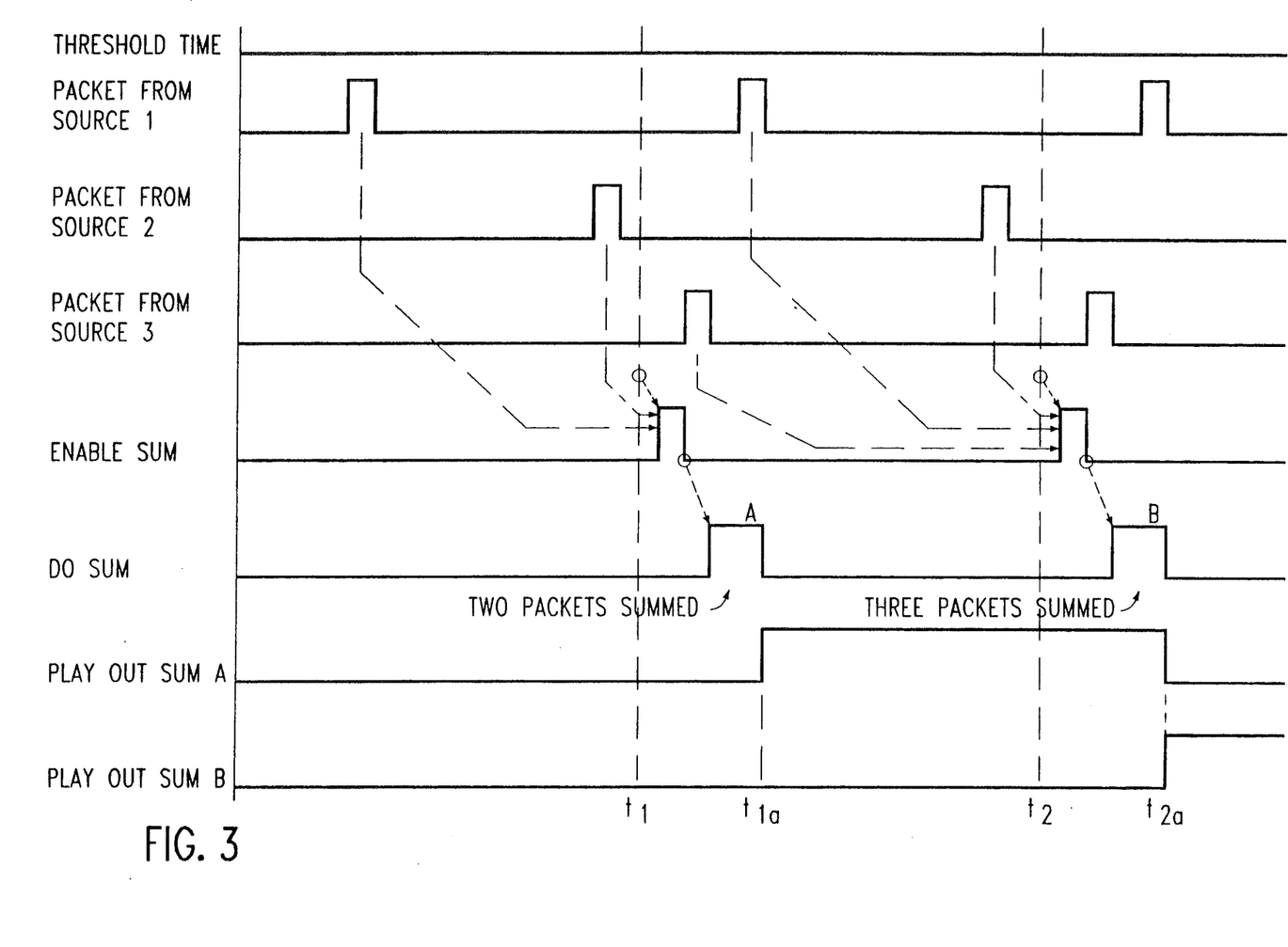
FIG. 3 is a timing diagram explaining the operation of a preferred form of the invention.

The technique of summing of digital data is also nontrivial and in the past has either required synchronization of stations connected to the network, local realignment in time of the voice packets or a summing upon arrival of each voice packet received by a particular station all of which required complex circuitry. With reference to FIG. 3, the time base operation of the current invention will now be discussed to demonstrate how these prior constraints on a distributed digital network are eliminated by the present invention.

Referring now to FIG. 3, a plurality of time periods are established by the time base of each subscriber station. The time base, which is preferably adjustable, particularly in an adaptive manner, as will be described below, outputs a series of pulses at regular intervals t1, t2, etc. as illustrated by the threshold time waveform. In each of these time periods, one or more voice packets may be received over the network from other conference call member nodes. Assume, now, that in the time period prior to t1, one voice packet is received from each of source 1 and source 2. These packets are unsynchronized, as illustrated and may appear at any time within that time period. The packets are then stored as digital data, preferably in separate first in - first out buffers or other circuitry emulating such a plurality of buffers. At time t1, the interval is terminated by a threshold time pulse from the time base and a new time period is begun. In response to the threshold time pulse, an Enable Sum pulse is produced, preferably slightly delayed from the threshold time pulse. In response to the Enable Sum pulse, the stored voice packets are summed and the summed signal, Sum A, is played out over the period t1a-t2a.

The process is repeated during the interval t1-t2 with the summed signal representing the sum or other desired logical combination of voice packets from Source 1, Source 2 and Source 3, Sum B, being generated subsequent to time t2 and played out beginning at time t2a, which is the time of termination of the playing out of Sum A. Therefore, the played out signal will appear to the user as an uninterrupted audio signal. The process will then be repeated over contiguous intervals for the duration of the conference call.

It is important to note from FIG. 3, that not all conference member nodes will necessarily produce a voice packet to be summed during each time base interval. It is contemplated that each voice server will contain a voice activated switch for the purpose of detecting voice bursts in a manner similar to that disclosed in "A New Digital Voice-Activated Switch" by J. A. Jankowski, Jr., published in COMSAT Technical Review, Vol. 6, No. 1, Spring 1976, which is also hereby fully incorporated by reference. The use of such a voice activated switch reduces traffic on the network and improves noise immunity of the system by avoiding transmission of non-voice signals in the manner described in this article.

It is also important to note in FIG. 1 that only one voice packet from any single source is summed for any particular time interval and that the summing and the playing out of the summed signal is done entirely at the convenience of the local voice server. If more than one voice packet is received from a single source within a time base interval, it is simply stored until it can be summed with other signals and played out in a subsequent interval. It may also be desirable under some circumstances to regard such extra voice packets as "bad data" and simply ignore or discard them since the effect on the resulting audio signal will be small and effectively masked by other voice signals from other member nodes. However, it is deemed desirable that at least the fact of the arrival of such extra voice packets be at least temporarily stored for purposes of adjustment of the time base, as will be discussed in greater detail below.

Also, the invention provides an effective shifting of the incoming voice packets which is completely transparent to the user and which avoids the need to provide synchronization between stations in order to properly carry out the summing operation.

As pointed out above, the invention exploits the inaudibility of distortion, particularly in the presence of other conference call voice signals and the undetectability of delays in voice signals by the user when the user has no time reference by which to observe such delays. Typically, in accordance with accepted practices, during voice bursts, samples will be taken at a rate of about 8000 samples per second to obtain acceptable reproduction of high frequencies in the voice signal. While in some applications in the prior art, it has been deemed desirable to represent only a small number of voice samples in a single voice packet, since the sampling time or playout time of a single voice packet will impose a minimum unavoidable delay in the system, it has been found to be advantageous in the practice of the present invention to represent 512 samples in a single voice packet. This number of samples corresponds to 64 milliseconds per packet. The processing time for a packet is approximately 3 milliseconds, resulting in a minimum delay of 67 milliseconds in the system. This minimum delay can be changed at will by the designer based on the design criteria for a particular application of the invention. Accordingly, the maximum delay in realignment according to the preferred embodiment of the invention will be a small multiple (e.g. the queue length) plus a fraction of a 64 millisecond packet period plus a few additional milliseconds for processing. Since the listener will have no time reference by which to observe such a delay, even a substantial delay caused by increase of queue length will remain undetectable. Therefore, the performance of the system will remain satisfactory even when relatively large differences in threshold timer periods exist between subscriber nodes.

In effect, each conference member node is able to synchronize the voice packets without the need to synchronize the member nodes themselves. This technique also avoids any possible need for arbitration or the determination of a master node for purposes of controlling synchronization as well as the need to transmit synchronization information over the distributed network. This technique, which accomplishes time realignment in a simple manner, also avoids the complexity of accommodation or reconstruction of delays affecting the arrival time of voice packets in past attempts to provide conference calling where packets were summed as they arrived at individual nodes, as previously described.

Referring now to FIG. 4, the voice server according to the present invention will be described. This voice server is identical to that described in the above-incorporated, concurrently filed, application except for the inclusion of the conference call processing block 300. Corresponding reference numerals are used in both applications in the interest of consistency and clarity.

A standard telephone set 208 is provided to be interfaced with the network 200 by network interface 201 and will be controlled by some form of a control computer in the same manner. The design of the interface 201 is well understood in the art and the particulars thereof are not necessary to the practice of the invention. It is, however to be understood that the interface 201 is responsive to difference between control packets and data packets, in this case, packets which will be referred to as voice packets to indicate that they are digital data representative of analog signals to be reproduced by the telephone set. The voice server directs voice packets to coder/decoder 205 and control packets to state machine 202. It is also to be understood that the equipment referred to by the term "standard telephone set" can be any type of equipment which is capable of communicating over telecommunication networks and can include such devices as answering machines, modems, encryption devices and the like. For clarity of description of the invention, however, the telephone set will be assumed to be a device including a handset, on-hook switch and a keypad, although the invention is equally applicable to corresponding structures in other types of equipment. Hybrid functions (also referred to, in the telecommunications art, as hybrid coil and 2-to-4 wire conversion functions) and off-hook detection functions 207 are provided and are responsive to the on-hook switch, the keypad and any other control features, such as a hold call button, which may be included in the telephone set. Ringing and supply voltages 206 are also supplied locally to the telephone set. A coder/decoder 205 is provided to perform not only the analog-to-digital and digital-to-analog conversions of voice data, as in the prior art, but also analog waveform generation under control of digital tone generator 203 in a manner well-understood in the art. The coder/decoder, referred to hereafter as the coder, should also include echo cancellation circuitry for proper operation of the telephone set. However, the echo cancellation function, like the hybrid coil function noted above does not affect the operation of the invention.

The combination of digital tone generator 203, adder or mixer 204 and coder/decoder 205 can take at least two forms. In one form, digital waveform generation is performed in digital tone generator 203 and mixed with the analog output of the coder/decoder prior to input to element 207. In such a case, the decoded output of the coder/decoder 205, in response to a control signal received from the network or element 207, is input to state machine 202 which controls the digital tone generator to provide corresponding call progress tones (e.g. dial tone, ringing tone, busy tone, call waiting tone, etc.). According to the preferred embodiment of the invention, however, as illustrated, the state machine 202 controls the generation of a code which is mixed with or added to the incoming digital data at element 204 and the analog waveforms corresponding to the progress tones are generated in the coder/decoder in an identical manner, regardless of the source of such control signals.

Bidirectional communication is provided between the state machine 202 and each of the ringing and supply source 206, element 207, coder/decoder 205, digital tone generator 203 and interface 201. State machine 202 is typically constituted by a programmed microprocessor to have a predetermined sequence of allowable states. Bidirectional communication is also provided between the state machine and the conference call packet processor 300, as will be detailed below. The state machine, responsive to inputs from the conference master keypad and command packets from other conference member nodes, will control the creation maintenance and termination of a conference call, as disclosed in the concurrently filed application, incorporated by reference above. During a conference call, the state machine 202 will receive command packets from the other conference member nodes from network interface 201 and information concerning the processing of voice packets by the conference call packet processor 300 to control the operation of elements of the conference call packet processor.

Figure 5:
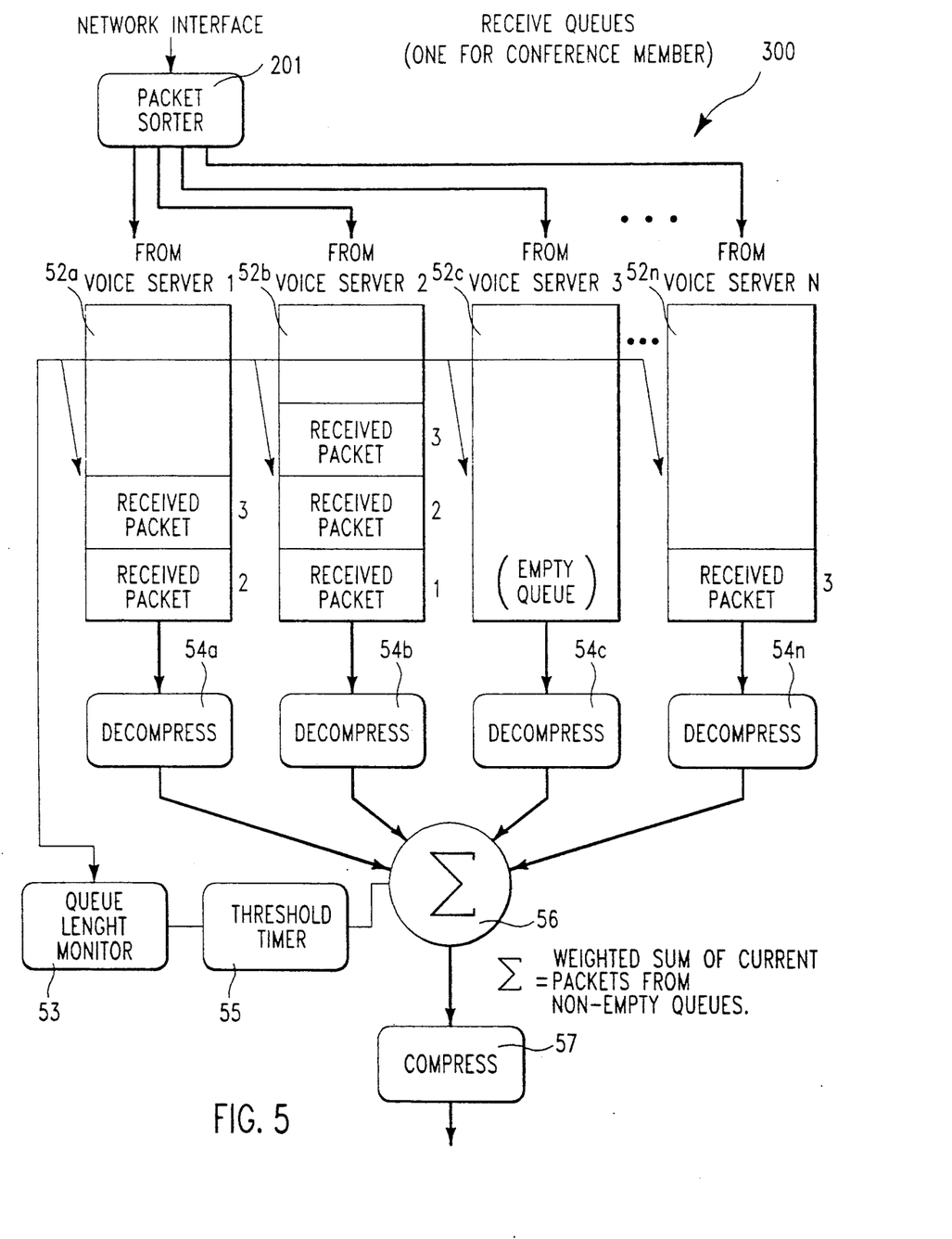
FIG. 5 is a block diagram of the preferred arrangement for adjusting the time base of a station during a conference call.

Specifically, and with reference to FIG. 5, during a conference call, the state machine will store the number and identities of the conference members and control packet sorter to distribute incoming voice packets in accordance with the source identification code contained in each voice packet. The state machine will also allocate storage in the voice packet processor to the respective conference member nodes and establish a receive queue 52a-52d for each conference member node.

A queue length monitor is provided to determine the number of voice packets waiting to be played out in each queue corresponding to each respective conference member node, and, responsive to any queue reaching a predetermined length corresponding to a potentially detectable delay, controls the frequency or period of threshold timer 55. The queue lengths are also communicated to the state machine or other circuit for controlling voice packet storage so that extra packets can be discarded in the manner described above should any queue reach an excessive length. This feature is advantageous in reducing over-control of the period of threshold timer 55 and a combination of adjustment of threshold timer period and discarding of voice packets will result in the circuit achieving an adaptive adjustment of threshold period with minimum audible distortion of the voice signal. Discarding of voice packets also reduces processing time required for voice signals and may be used to obtain sufficient time for other call maintenance functions. The queue length monitor is also able to increase the period of the threshold timer if no more than several voice packets are present in any queue and more than a predetermined number of queues are periodically empty while those queues are receiving voice packets. It should be noted that because of silence detection or voice-activated switching, if it is used, many queues may be empty during proper operation since voice packets will not be transmitted during periods of silence at corresponding conference member nodes. However, if the threshold period is too short and voice packets are being received for a particular queue, that queue will alternate between having one voice packet and being empty in a succession of threshold time periods. Since this condition, generating inter-packet gaps, can lead to audible distortion, this same condition should be discriminated and used to control the adaptive increase of threshold time period duration. This adaptive clocking technique allows for the proper summing of received voice packets while, at most requiring the discarding of a relatively small number of voice packets even for relatively great variance of threshold timer rate between nodes. Clearly the need for synchronization of the conference member nodes is avoided and the distortion caused by the discarding of voice packets will be inaudible as well as masked by other voice signals.

It should also be noted that the adaptively variable threshold timer can also be used to clock voice sampling rate and the transmission of voice packets. If this is done, all conference member will converge to approximately the same threshold timer period during voice bursts. Alternatively, the length of transmission queues, which will usually be only one packet deep, can be used to adaptively adjust the time base rather than receiving queues. In either case, the resulting timer period will approximate the playout interval of a voice packet (t1a–t2a of FIG. 3) which will lead to minimization of distortion and optimum fidelity of the voice signal reproduced.

After temporary storage of the voice packets in queues 52a–52d the individual voice packets from the respective non-empty queues will be summed. This summation will preferably be done in a linear fashion. However, a non-linear or weighted summation may be advantageous in some applications, such as for increased noise rejection. On the other hand, linear summation is preferable if data compression techniques such as $\mu$-law or LPC have been applied to the voice packets and, in such a case, the voice packets should be decompressed prior to summation as shown at 54a–54d. If the hardware of the adder 204 and/or coder 205 is intended to receive compressed data, the summed signal should again be compressed, as illustrated at 57 of FIG. 5. It is to be understood that such data compression, while often useful to increase the data carrying capacity of the network, is not essential to the practice of the invention and the invention is not limited to any particular data compression or decompression scheme or the use of data compression at all.

In operation, the arrangement of FIG. 5 provides the adaptive adjustment of threshold timer period to maximize fidelity of the voice transmission during the practice of the invention. The invention may clearly be practiced without any adjustment or with manual, rather than adaptive, adjustment. In such a case, if the local threshold timer provide shorter period than the source, interpacket gaps may be created but these gaps are generally inaudible unless the clock rates are drastically different. If the local threshold time periods are longer than the source, then the packets merely accumulate and appear in the reproduced signal as increased end-to-end delays which are also typically inaudible. The threshold timer can also be adjusted or adaptively corrected on the basis of monitoring such delays. Also, these delays can be ameliorated by discarding voice packets, depending on the fidelity required, as indicated above.

In summary, the invention provides a simple arrangement for effectively aligning randomly arriving voice packets which eliminates the need to synchronize conference member nodes during a conference call. This effective alignment in accordance with and under the control of a local time base also simplifies the summing operation to an extent that enables practical implementation of conference calling over a distributed digital network. Losses of fidelity due to this technique are extremely small and generally inaudible or masked by other voice signals. Such losses of fidelity can be further minimized by the use of adaptive time base adjustment based on the length of voice packet queues anywhere in the system, but, most advantageously, at the receiving queues of the local station.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for summing digital voice packets including the steps of
    establishing a time base for providing a plurality of periodic signals during a time interval,
    asynchronously receiving said digital voice packets from at least two sources during said time interval, and
    storing said digital voice packets in respective queues corresponding to ones of said at least two sources, and
    calculating, during a period between two sequential ones of said periodic signals, a sum of ones of said digital voice packets from each of said queues which contain at least one digital voice packet.

2. A method for summing digital voice packets as recited in claim 1, wherein said step of calculating a sum comprises calculating a linearly weighted sum of all of said digital voice packets asynchronously received during a time period between sequential ones of said plurality of periodic signals.

3. A method for summing digital voice packets as recited in claim 1, wherein the periodicity of said periodic signals generated by said time base is approximately equal to the duration of data contained within one of said voice packets.

4. A method for summing digital voice packets as recited in claim 3, wherein said step of establishing a time base for providing a plurality of periodic signals during a time interval includes the further step of adjusting the periodicity of said periodic signals generated by said time base to match a digitizing frequency of one of said at least two sources of voice packet data.

5. A method for summing digital voice packets as recited in claim 4, wherein said step of establishing a time base for providing a plurality of periodic signals during a time interval includes the further step of monitoring a queue of voice packets and decreasing the period of said time base when said queue reaches a predetermined length.

6. A method for carrying out a conference connection over a distributed digital network including the steps of
asynchronously receiving, at a predetermined station connected to said conference call connection, digital voice packets from selected stations connected to said network and included in the conference connection other than said predetermined station, and
storing said digital voice packets in respective queues corresponding to ones of said at least two sources, and
calculating, during a period between two sequential ones of said periodic signals, a sum of ones of said digital voice packets from each of said queues which contain at least one digital voice packet.

7. A method for carrying out a conference connection over a distributed digital network as recited in claim 6, wherein said step of calculating a sum comprises calculating a linearly weighted sum of all of said digital voice packets asynchronously received during a time period between sequential ones of said plurality of periodic signals.

8. A method for carrying out a conference connection over a distributed digital network as recited in claim 6, wherein the periodicity of said periodic signals generated by said time base is approximately equal to the duration of data contained within one of said voice packets.

9. A method for summing digital voice packets as recited in claim 8, including the further step of adjusting the periodicity of said periodic signals generated by said time base to match a digitizing frequency of one of said selected stations connected to said network included in the conference connection other than said predetermined station.

10. A method for summing digital voice packets as recited in claim 9, including the further step of monitoring a queue voice packets and decreasing the period of said time base when said queue reaches a predetermined length.

11. A voice server for a distributed digital network including
means for establishing a time base for providing a plurality of periodic signals during a time interval,
means for asynchronously receiving digital voice packets from at least two sources during said time interval, and
means for storing said digital voice packets in respective queues corresponding to ones of said at least two sources, and
means for calculating a sum of ones of said digital voice packets from each of said queues which contain at least one digital voice packet.

12. A voice server for a distributed digital network as recited in claim 11 wherein
said voice packets contain compressed digital voice data and
said means for calculating a sum includes means for calculating a linearly weighted sum of all of said digital voice packets asynchronously received during a time period between sequential ones of said plurality of periodic signals.

13. A voice server for a distributed digital network as recited in claim 11, wherein the periodicity of said periodic signals generated by said time base is approximately equal to the duration of data contained within one of said voice packets.

14. A voice server for a distributed digital network as recited in claim 13, wherein said time base for providing a plurality of periodic signals during a time interval includes means for adjusting the periodicity of said periodic signals generated by said time base to match a digitizing frequency of one of said at least two sources of voice packet data.

15. A voice server for a distributed digital network as recited in claim 14, wherein said time base for providing a plurality of periodic signals during a time interval includes means for monitoring a queue of voice packet data and decreasing the period of said time base when said queue reaches a predetermined length.

16. A distributed digital network for communicating data in packets among a plurality of nodes, said distributed digital network including
means for establishing a time base for providing a plurality of periodic signals during a time interval for at least one said node,
means for asynchronously receiving digital data packets from at least two sources during at least one said time interval, and
means for storing said digital data packets in respective queues corresponding to ones of said at least two sources, and
means for performing, during a period between two sequential ones of said periodic signals, a logical combination of ones of said digital data packets from each of said queues which contain at least one digital voice packet.

17. A distributed digital network as recited in claim 16, including a first in—first out storage means for storing said digital data.

18. A distributed digital network as recited in claim 17, including means for monitoring contents of said first in—first out storage means.

19. A distributed digital network as recited in claim 18, including means responsive to said monitoring means for adjusting the period of said means for establishing a time base.

20. A distributed digital network as recited in claim 16, wherein said logical combination is a sum.

* * * * *